(12) United States Patent
Ishida et al.

(10) Patent No.: US 11,529,694 B2
(45) Date of Patent: Dec. 20, 2022

(54) REPLACEABLE-BLADE-TYPE SAW

(71) Applicant: TAKAGI CO., LTD., Sanjo (JP)

(72) Inventors: Masashi Ishida, Sanjo (JP); Yoshiaki Yokota, Sanjo (JP)

(73) Assignee: TAKAGI CO., LTD., Sanjo (JP)

(*) Notice: Subject to any disclaimer, the term of this patent is extended or adjusted under 35 U.S.C. 154(b) by 711 days.

(21) Appl. No.: 16/316,132

(22) PCT Filed: Jun. 30, 2017

(86) PCT No.: PCT/JP2017/024091
§ 371 (c)(1),
(2) Date: Jan. 8, 2019

(87) PCT Pub. No.: WO2018/216230
PCT Pub. Date: Nov. 29, 2018

(65) Prior Publication Data
US 2021/0299770 A1    Sep. 30, 2021

(30) Foreign Application Priority Data
May 24, 2017   (JP) .............................. JP2017-102830

(51) Int. Cl.
*B23D 51/10*    (2006.01)
*B23D 51/01*    (2006.01)
*B23D 61/12*    (2006.01)

(52) U.S. Cl.
CPC ............. *B23D 51/10* (2013.01); *B23D 51/01* (2013.01); *B23D 61/123* (2013.01)

(58) Field of Classification Search
CPC ...... B23D 51/10; B23D 61/123; B23D 51/01; B26B 9/00; B26B 5/001; B26B 5/002; B26B 5/003

(Continued)

(56) References Cited

U.S. PATENT DOCUMENTS 2,140,496 A * 12/1938 Coleman ................ B23D 51/10
30/525
2,947,085 A * 8/1960 Schmitt ................... B27B 21/08
7/150

(Continued)

FOREIGN PATENT DOCUMENTS

CN    2 691 761 Y    4/2005
JP    36-8793 Y1    4/1961

(Continued)

OTHER PUBLICATIONS

Communication dated Jan. 22, 2021 from European Patent Office in counterpart European Patent Application No. 17910731.3 European Search Report.

(Continued)

*Primary Examiner* — Jonathan G Riley
(74) *Attorney, Agent, or Firm* — Sughrue Mion, PLLC

(57) ABSTRACT

An object of the present invention is to provide a replaceable-blade-type saw in which a handle fitting part can be insertably engaged in a guide member even if the width dimension of the handle fitting part is greater than the width dimension of the guide member. In a handle fitting part 3 of a saw blade 1 is formed a slit part 8, which is configured from a first slit part 6 formed inward from the side edge part of the handle fitting part 3, and a second slit part 7 formed as a continuation of the first slit part 6 as well as being formed toward the distal end side of the handle fitting part 3 from an inner end part 6A of the first slit part 6, and a slit outer-side part 9 positioned on the outer side of the slit part 8 of the handle fitting part 3 is elastically moved or elastically deformed inward by the slit part 8 when bearing external force exerted inward from the side-edge-part side.

7 Claims, 7 Drawing Sheets

(58) Field of Classification Search
USPC .................. 30/346–357, 329–339, 340, 342
See application file for complete search history.

(56) References Cited

U.S. PATENT DOCUMENTS

| | | | | |
|---|---|---|---|---|
| 3,946,778 | A * | 3/1976 | Knuth | B23D 61/122 |
| | | | | 30/501 |
| 5,722,168 | A * | 3/1998 | Huang | B23D 51/01 |
| | | | | 30/160 |
| 6,113,618 | A * | 9/2000 | Nic | B23D 61/006 |
| | | | | 30/351 |
| 7,600,458 | B2 * | 10/2009 | Hampton | B23D 51/08 |
| | | | | 30/337 |
| 9,925,605 | B2 * | 3/2018 | Wang | B23D 51/01 |
| 2004/0168328 | A1 * | 9/2004 | Thomas | B23D 51/10 |
| | | | | 30/519 |
| 2010/0018065 | A1 * | 1/2010 | Janssson | B27B 21/04 |
| | | | | 30/517 |
| 2010/0031512 | A1 * | 2/2010 | Rowlay | B23D 61/123 |
| | | | | 30/161 |
| 2010/0319201 | A1 * | 12/2010 | Scott | B23D 51/10 |
| | | | | 30/166.3 |

FOREIGN PATENT DOCUMENTS

| | | |
|---|---|---|
| JP | 36-8793 Y1 | 6/1961 |
| JP | 47-26192 U1 | 11/1972 |
| JP | 48-16490 U1 | 2/1973 |
| JP | 61-20302 U1 | 2/1986 |
| JP | 62-28504 U1 | 2/1987 |
| JP | 2-117102 U1 | 9/1990 |
| JP | 7-132502 A | 5/1995 |
| JP | 2000-326303 A | 11/2000 |
| JP | 2003-62804 A | 3/2003 |
| JP | 2003062804 A * | 3/2003 |

OTHER PUBLICATIONS

International Search Report for PCT/JP2017/024091 dated, Sep. 19, 2017 (PCT/ISA/210).

* cited by examiner

REPLACEABLE-BLADE-TYPE SAW

CROSS REFERENCE TO RELATED APPLICATIONS

This application is a National Stage of International Application No. PCT/JP2017/024091 filed Jun. 30, 2017, claiming priority based on Japanese Patent Application No. 2017-102830, filed May 24, 2017.

TECHNICAL FIELD

The present invention relates to a replaceable-blade-type saw in which a saw blade is detachably and replaceably provided to a grip handle.

BACKGROUND ART

A replaceable-blade-type saw has a saw blade mounted in a grip handle so as to be capable of being detached and replaced. When a handle fitting part at the base portion of the saw blade is inserted into the grip handle, the inserted handle fitting part is insertably engaged and positioned in a guide member housed within the grip handle. In this state of being positioned within the guide member, the handle fitting part is restrained by a restraining mechanism provided to the grip handle and fixedly positioned in the guide member, whereby the saw blade is fixedly mounted in the grip handle.

In this replaceable-blade-type saw, for the saw blade to be mounted in the grip handle in a precisely fixed state with no rattling, the handle fitting part inserted into the grip handle must be precisely positioned (fixed) in the guide member inside the grip handle with no rattling occurring; therefore, in the prior art, the handle fitting part and the guide member have been designed with strict dimensional tolerance such that when the handle fitting part is insertably engaged in the guide member, there is almost no clearance between the handle fitting part and the guide member.

Therefore, when dimensional tolerance is only at the acceptable minimum due to machining error, there is no clearance between the handle fitting part and the guide member, and simply due to a slight change in the insertably engaged orientation (positional misalignment) of the handle fitting part in the guide member, which is caused by a load during use, an adverse event sometimes occurs in which the handle fitting part cuts into the guide member and the saw blade cannot be easily taken out of the grip handle.

When the dimensional tolerance requirement is not met and the width dimension of the handle fitting part is greater than the width dimension of the guide member, the handle fitting part can no longer be precisely insertably engaged in the guide member up to the end (up to a prescribed position), and as shown in FIG. 6, positional misalignment occurs between a handle-fitting-part-side insertion hole 20 which is provided to the handle fitting part and through which a restraining mechanism (e.g., a lock pin) is inserted and a guide-member-side insertion hole 21 provided to the guide member, the restraining mechanism cannot be inserted through these insertion holes, and the restraining mechanism cannot be operated, inevitably resulting in a defective product in which the saw blade cannot be fixedly mounted in the grip handle.

Thus, prior-art replaceable-blade-type saws are problematic in that machining error eliminates the clearance between the handle fitting part and the guide member, and due to the width dimension of the handle fitting part being greater than the width dimension of the guide member, a saw blade mounted in the grip handle will not come out, and the saw blade can also not be mounted in the grip handle.

In order to resolve such a problem with engaging clearance (machining error) between the handle fitting part and the guide member, it has been proposed in the prior art to design to dimensions allowing for an appropriate amount of clearance between the handle fitting part and the guide member, to interpose a plate spring or another urging body in this clearance, and to fixedly press and urge the handle fitting part into the guide member by an urging body without being affected by the change in clearance (dimension variation caused by machining error), as is shown in, for example, Patent Document 1.

Though not a handsaw type in which a saw blade is mounted in a grip handle, what is also proposed in a replaceable-blade finger cutter such as is disclosed in Patent Document 2 is the concept that a slit is formed in a proximal part of a blade body, a spring effect (elastic deformation effect) is produced in the blade body proximal part by this slit, and, due to contracting elastic deformation caused by this spring effect, the blade body proximal part, which is set to a width dimension greater than the width dimension of an engaging part for mounting the blade body, can be insertably engaged.

PRIOR ART DOCUMENTS

[Patent Document 1] Japanese Utility Model Application No. 61-20302 [Patent Document 2] Japanese Laid-open Patent Application No. 7-132502

SUMMARY OF THE INVENTION

Problems the Invention is Intended to Solve

However, when the configuration involves a plate spring or other urging body being interposed between the handle fitting part and the guide member, the number of parts increases in proportion to this urging body and more man-hours are needed to attach this urging body to the handle fitting part or the guide member, and a problem of increased manufacturing cost therefore arises.

When a slit is formed in the handle fitting part side, the configuration could have a slit 31 formed by incision in the direction opposite the insertion direction from an insertion-side distal end part of a handle fitting part 30, as shown in, for example, FIG. 7, and a spring effect is imparted to the handle fitting part 30. However, when such a slit 31 is formed, contracting elastic deformation occurs starting at a slit inner end part 32 (a support point), the width by which the slit inner side deforms relative to the slit distal end side is therefore decreased, and contracting deformation therefore occurs, which allows the entire handle fitting part 30 to be reliably insertably engaged in a guide member 33. Therefore, the slit length must be set to a longer length equivalent to the length dimension of the handle fitting part 30 (the length dimension in the insertion direction orthogonal to the width dimension of the handle fitting part), or specifically, to a dimension longer than the length dimension of the handle fitting part 30, but when the slit length is longer than the handle fitting part itself, not only is the slit exposed (not only does the slit 31 protrude) from the grip handle 35 and the appearance worsened when the saw blade 34 is set into the grip handle 35, but there is also a risk of a decrease in the strength of the saw blade itself.

The present invention was devised in view of the foregoing, and it is therefore an object of the invention to provide an innovative replaceable-blade-type saw in which a slit part is formed without protruding from a grip handle, a satisfactory appearance is preserved, the strength of the saw blade is maintained, and exceptional practical utility is realized, despite the replaceable-blade-type saw having a simple configuration in which a slit is formed in a handle fitting part to impart a spring effect to the handle fitting part, and the handle fitting part can be insertably engaged in a guide member by contracting elastic deformation caused by this spring effect even if the width dimension of the handle fitting part is greater than the width dimension of the guide member.

DISCLOSURE OF THE INVENTION

The main points of the present invention are described below with reference to the attached drawings.

A first aspect of the present invention relates to a replaceable-blade-type saw comprising a saw blade 1 and a grip handle 2, in which when a handle fitting part 3 provided to the base of the saw blade 1 is inserted into the grip handle 2, the handle fitting part 3 is engaged and guided into a guide member 4 housed within the grip handle 2, the saw blade 1 assumes a prescribed fitted orientation, the handle fitting part 3 is locked in the guide member 4 by a restraining mechanism 5 provided to the grip handle 2, the saw blade 1 is mounted in the grip handle 2 so as to be incapable of withdrawing, and releasing the restraining mechanism 5 causes the locked state of the handle fitting part 3 in the guide member 4 to be released, allows the saw blade 1 to be withdrawn from the grip handle 2, and enables the saw blade 1 to be replaced, wherein the replaceable-blade-type saw is characterized in that the handle fitting part 3 is configured such that a slit part 8, which is configured from a first slit part 6 formed inward from the side edge part of the handle fitting part 3, and a second slit part 7 formed as a continuation of the first slit part 6 as well as being formed toward the distal end side of the handle fitting part 3 from an inner end part 6A of the first slit part 6, is formed on at least one of a blade part side and a rear part side, and a slit outer-side part 9 positioned on the outer side of the slit part 8 of the handle fitting part 3 is elastically moved or elastically deformed inward by the slit part 8 when bearing external force exerted inward from the side-edge-part side.

A second aspect of the present invention also relates to the replaceable-blade-type saw according to the first aspect, characterized in that the first slit part 6 is formed in the proximal end part of a blade plate part 10 of the saw blade 1, inward from a position that is the proximal end part of the handle fitting part 3.

A third aspect of the present invention also relates to the replaceable-blade-type saw according to either one of the first and second aspects, characterized in that the second slit part 7 is configured from a side-edge-extending slit part 7A formed along the side-edge part of the handle fitting part 3, and a distal-end-edge-extending slit part 7B formed continuously with the side-edge-extending slit part 7A as well as being formed along the distal-end-edge part of the handle fitting part 3.

A fourth aspect of the present invention also relates to the replaceable-blade-type saw according to either one of the first and second aspects, characterized in that the handle fitting part 3 is formed into a trapezoid shape in which the length of the side-edge part on the blade part side is set to be less than the length of the side-edge part of the rear part side, and the slit part 8 is formed on the blade part side where the side-edge part length is less.

A fifth aspect of the present invention also relates to the replaceable-blade-type saw according to the third aspect, characterized in that the handle fitting part 3 is formed into a trapezoid shape in which the length of the side-edge part on the blade part side is set to be less than the length of the side-edge part of the rear part side, and the slit part 8 is formed on the blade part side where the side-edge part length is less.

Effects of the Invention

Because the present invention is configured as described above: the design of the present invention can be easily achieved with a simple configuration in which a slit part is formed in the handle fitting part to impart a spring effect to the handle fitting part, and the handle fitting part can be insertably engaged in the guide member by the elastic movement (or contracting elastic deformation) caused by the spring effect even if the width dimension of the handle fitting part is greater than the width dimension of the guide member; the external appearance is not compromised because the slit part formed in the handle fitting part does not protrude from the grip handle once the saw blade has been mounted in the grip handle; and the strength of the saw blade is also preserved.

Furthermore, the adverse event of the handle fitting part not coming out of the guide member is eliminated by the spring effect of the handle fitting part, and attaching and detaching the saw blade to and from the grip handle is therefore better facilitated.

However, because the handle fitting part, or specifically, the slit outer-side part constituting the outer-side portion of the slit part formed in the handle fitting part, engages in the guide member in a state of being urged by the spring effect caused by the formation of the slit part, an innovative replaceable-blade-type saw having exceptional practical utility is obtained in which there is no rattling of the handle fitting part insertably engaged in the guide member, and the saw blade is reliably, precisely, and firmly fixedly mounted in the grip handle with no rattling.

BEST MODE FOR CARRYING OUT THE INVENTION

Figure 1:
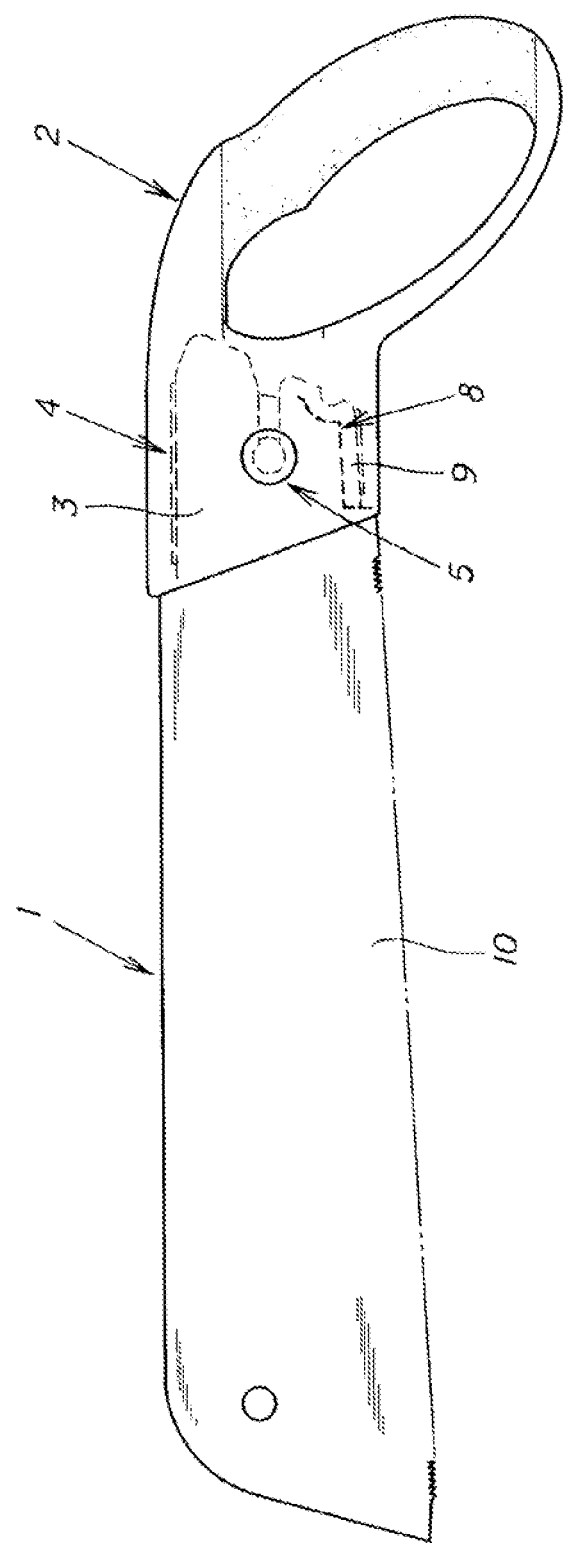
FIG. 1 is an explanatory front view of the present example.
Figure 2:
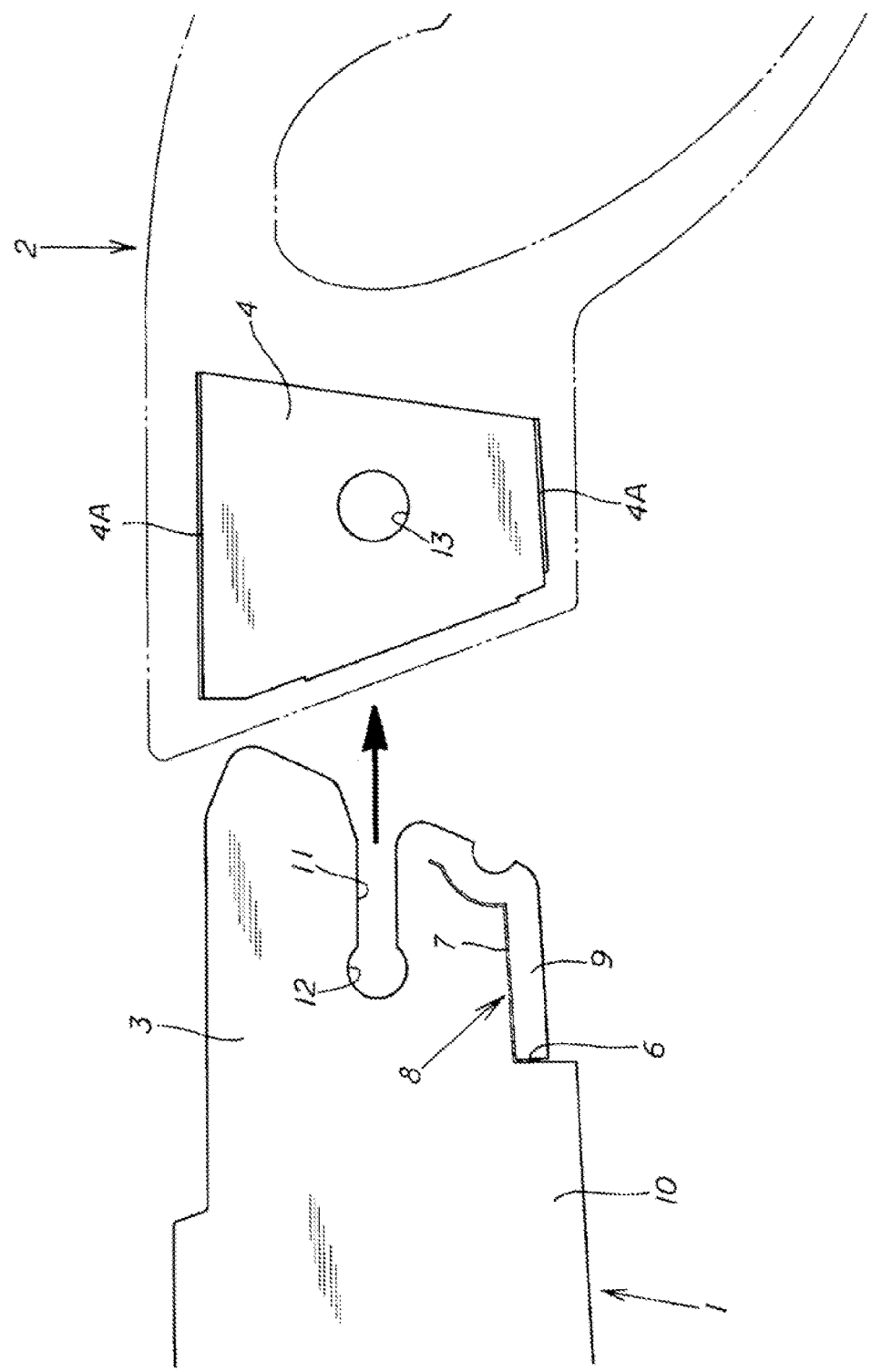
FIG. 2 is a schematic exploded explanatory view of the main part of the present example.
Figure 3:
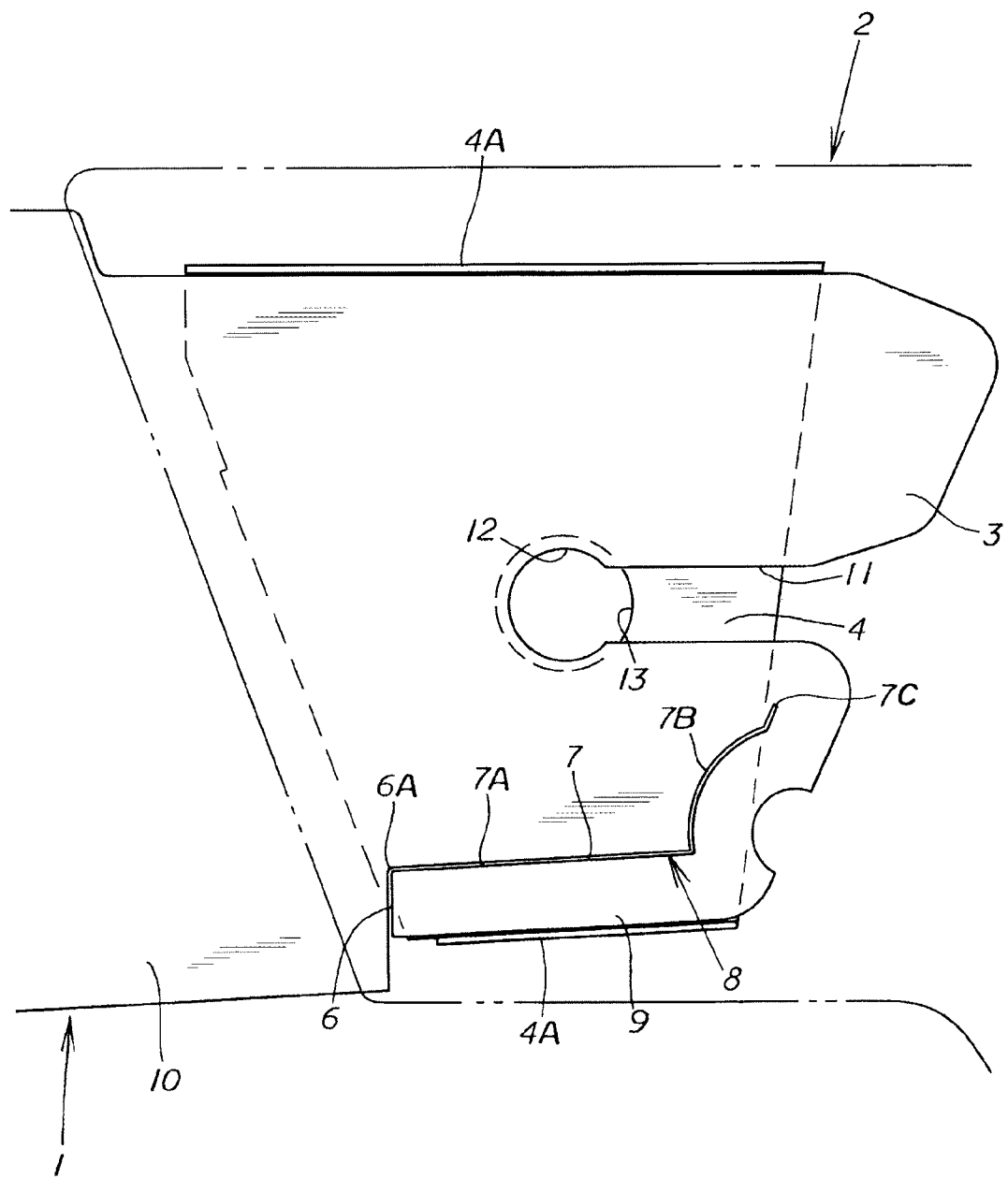
FIG. 3 is a schematic explanatory view of the main part of the present example.
Figure 4:
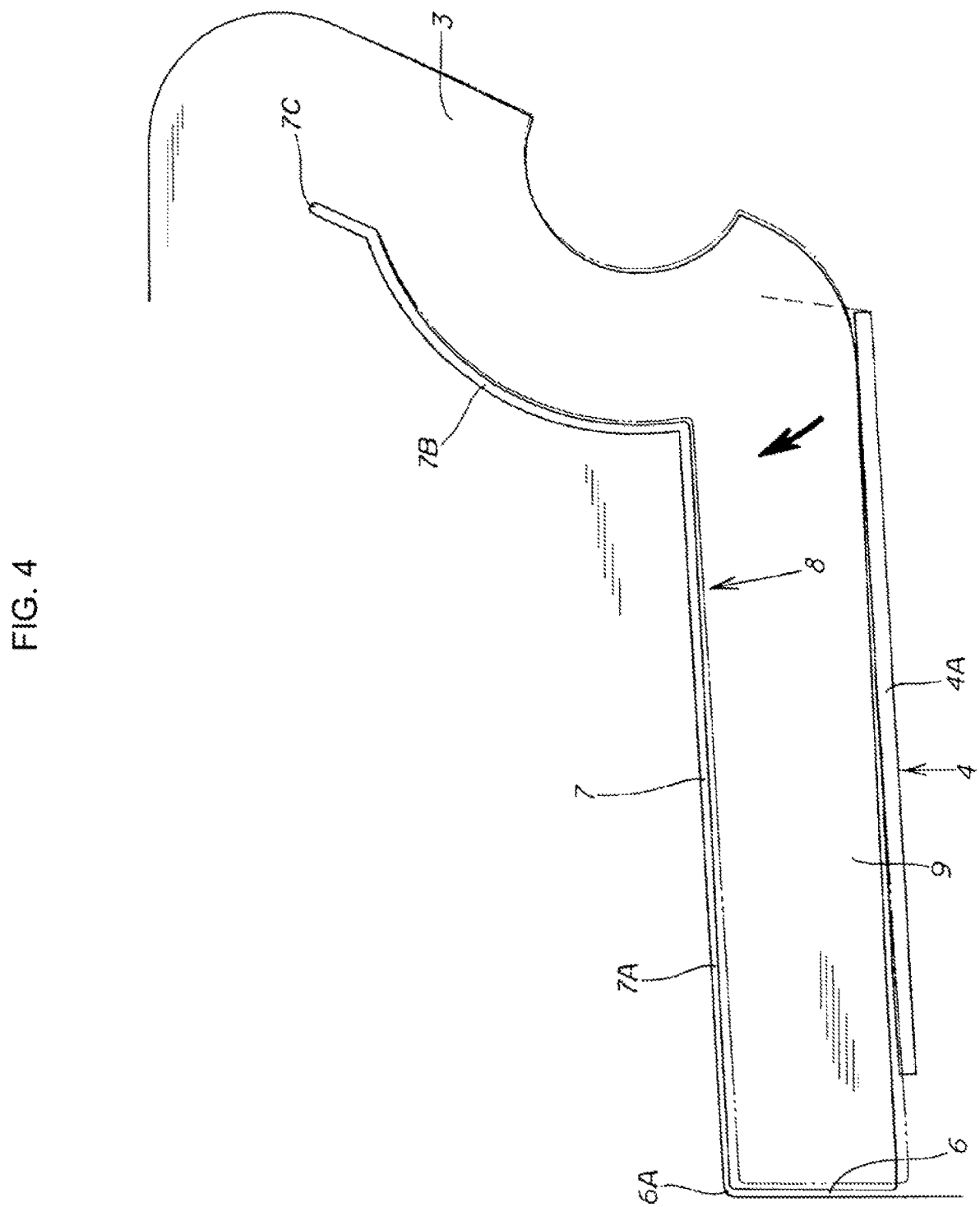
FIG. 4 is an action explanatory view of the slit outer-side part of the handle fitting part in the present example.
Figure 5:
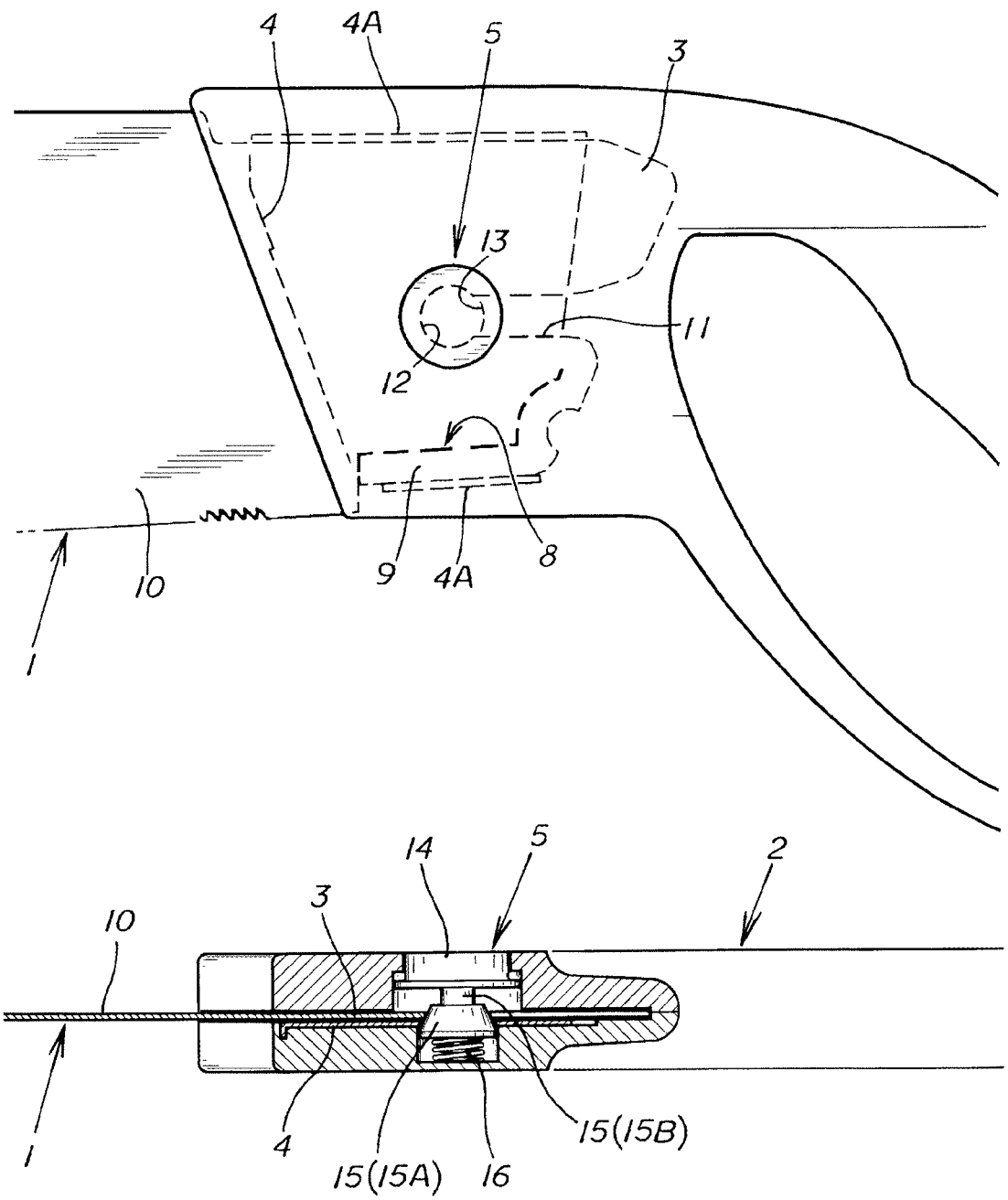
FIG. 5 is an explanatory view showing the restraining mechanism 5 of the present example.
Figure 6:
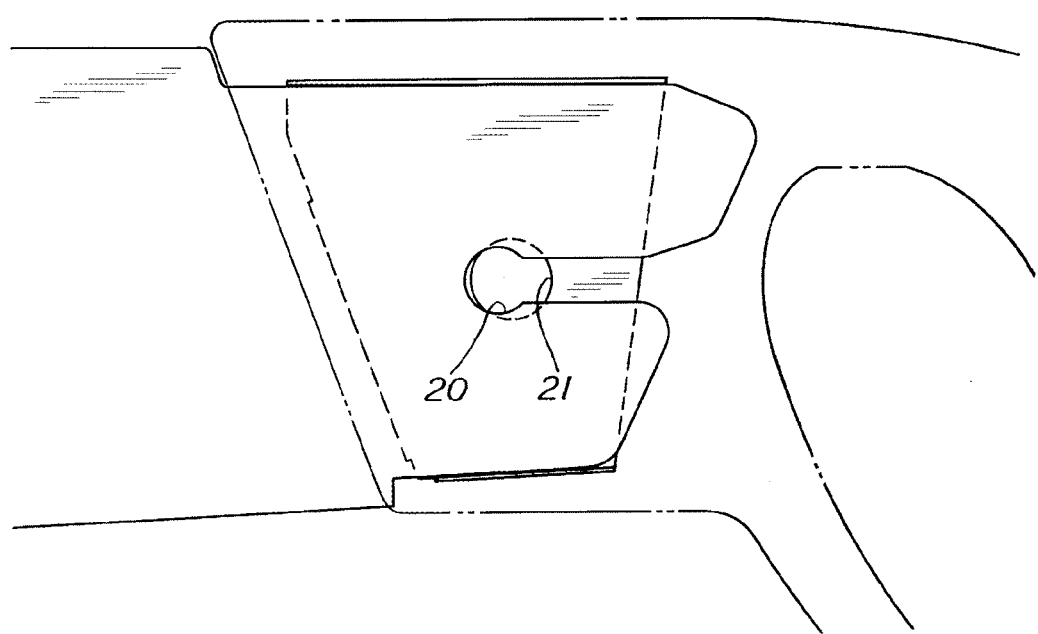
FIG. 6 is a schematic explanatory view of an example of an adverse event in a prior art example.
Figure 7:
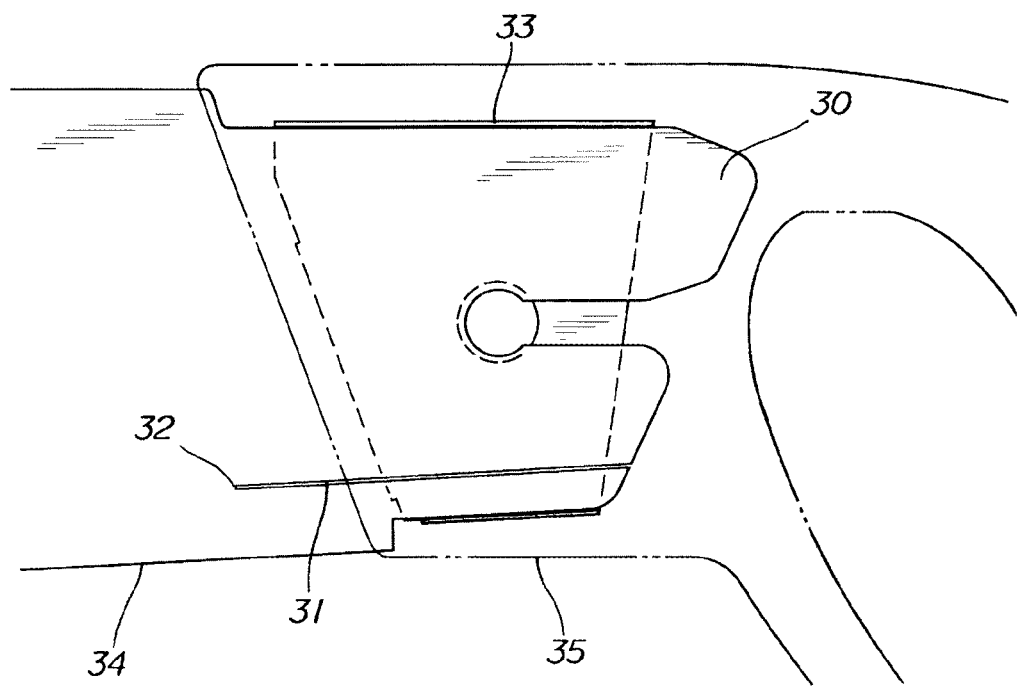
FIG. 7 is a schematic explanatory view of an example of a countermeasure based on the prior art example.

Preferred embodiments of the present invention are briefly described below with reference to the diagrams while indicating the effects of the present invention.

In a case in which the width dimension of the handle fitting part 3 is formed larger than the width dimension of the guide member 4, when the handle fitting part 3 provided to the base portion (proximal end part) of the saw blade 1 is inserted into the grip handle 2 in order to mount the saw blade 1 in the grip handle 2, partway along the insertion, the handle fitting part 3, or specifically, the side-edge part of the handle fitting part 3, and even more specifically the outer-side edge part of the slit outer-side part 9 positioned on the outer side of the slit part 8 formed in the handle fitting part 3, comes into contact with a guide edge part 4A of the guide member 4. The operation of mounting the saw blade 1 in the grip handle 2, i.e., the operation of inserting the handle fitting part 3 into the guide member 4 is performed with the handle fitting part 3 (the outer-side edge part of the slit outer-side part 9) in contact with the guide edge part 4A of the guide member 4, whereby the slit outer-side part 9 of the handle fitting part 3 receives a pressing effect of being pressed inward from the guide member 4 (the guide edge part 4A), and the slit outer-side part 9 is elastically moved (caused to undergo contracting elastic deformation) inward by a spring effect imparted by the formation of the slit part 8. Eue to the inward elastic movement of the slit outer-side part 9, the width dimension of the handle fitting part 3 decreases, the handle fitting part 3 is insertably engaged in the guide member 4, the handle fitting part 3 is fixedly positioned by the restraining mechanism 5 so as to be incapable of coming out of the guide member 4 while the handle fitting part 3 is in a state of being positioned and engaged in the guide member 4, and the saw blade 1 is fixedly mounted in the grip handle 2. Additionally, due to the spring effect of the handle fitting part 3, the adverse event of the handle fitting part 3 not coming out of the guide member 4 is resolved, and the operation of detaching the saw blade 1 from the grip handle 2 is thereby made even easier.

With the handle fitting part 3 insertably engaged in the guide member 4 and fixedly positioned in the guide member 4 by the restraining mechanism 5, the slit outer-side part 9 is pressably engaged (urged to engage) in the guide member 4 (the guide edge part 4A) by return urging occurring in the slit outer-side part 9 (movement urging directed toward the outside, which is the guide edge part 4A-side of the guide member 4), pressed engaging of the slit outer-side part 9 in the guide member 4 (the guide edge part 4A) causes the handle fitting part 3 to be positioned relative to the guide member 4 without rattling, and the saw blade 1 is thereby fixedly mounted without rattling in the grip handle 2 so as to be incapable of coming out.

In the present invention, because the slit part 8 formed in the handle fitting part 3 is configured from the first slit part 6 formed inward from the side edge part of the handle fitting part 3, and the second slit part 7 formed as a continuation of the first slit part 6 as well as being formed toward the distal end side of the handle fitting part 3 from an inner end part 6A of the first slit part 6, the slit outer-side part 9 elastically moves inward starting at a terminal end part 7C of the second slit part 7 positioned on the distal end-end side of the handle fitting part 3, whereby, in comparison with a prior-art variant in which a slit is formed by an incision in the direction opposite that in which the handle fitting part is inserted from the insertion-side distal end part, it is possible with a shorter slit length to increase the amount of elastic movement (amount of contracting elastic deformation) in the proximal end side of the handle fitting part 3, i.e., the proximal-end-part side of the blade plate part 10 where the blade part is provided in the saw blade 1, and because the slit part is formed from the proximal-end-part side toward the distal end-end-part side of the handle fitting part 3, the slit part 8 does not protrude from the grip handle 2 while the saw blade 1 is mounted in the grip handle 2, the outward appearance is therefore not compromised, and the strength of the saw blade 1 is preserved.

EXAMPLES

Specific examples of the present invention are described below with reference to the drawings.

The present example is a replaceable-blade-type saw comprising a saw blade 1 and a grip handle 2, the saw being configured such that: when a handle fitting part 3 provided to a base portion (a proximal end part on the side where the grip handle 2 is inserted) of the saw blade 1 is inserted into the grip handle 2, the handle fitting part 3 is insertably guided into a guide member 4 housed within the grip handle 2, the handle fitting part 3 is positioned and engaged relative to the guide member 4, and the saw blade 1 assumes a prescribed inserted orientation; the handle fitting part is restrained from falling out of the guide member 4 by a restraining mechanism 5 provided to the grip handle 2, causing the handle fitting part 3 to be locked into the guide member 4; the saw blade 1 is mounted in the grip handle 2 so that the saw blade 1 cannot come out (cannot be withdrawn); and releasing the restraining mechanism 5 causes the locked state of the handle fitting part 3 in the guide member 4 to be released, enabling the saw blade 1 to be withdrawn from the grip handle 2 and the saw blade 1 to be replaced.

The present example is configured so that in the machining of the saw blade 1, or specifically of the handle fitting part 3 of the saw blade 1, and also in the machining of the guide member 4 into which the handle fitting part 3 of the saw blade 1 is insertably engaged, the handle fitting part 3 can be insertably engaged in the guide member 4 even when machining error occurs and the width dimension of the handle fitting part 3 is formed to be greater (wider) than the width dimension of the guide member 4. Specifically, the present example is configured so that a slit part 8 is formed in the handle fitting part 3 provided to the proximal end part of the saw blade 1, a spring effect is imparted to the handle fitting part 3 by the formation of the slit part 8, and when the width dimension of the handle fitting part 3 is formed to be greater (wider) than the width dimension of the guide member 4, the handle fitting part 3 is elastically moved (subjected to contracting elastic deformation) by the pressing effect created by the operation of inserting (operation of fitting) the handle fitting part 3 into the guide member 4 by means of the spring effect, and the width dimension of the handle fitting part 3 decreases, whereby the handle fitting part 3 can be insertably engaged in the guide member 4 and the saw blade 1 can be mounted in the grip handle 2.

The constituent components according to the present example are described in detail below.

The saw blade 1 of the present example is composed of a blade plate part 10 in which a blade part is formed, and the handle fitting part 3 joined to (integrally formed with) the proximal end part of the blade plate part 10 and insertably engaged in the grip handle 2 (the guide member 4 housed within the grip handle 2), and the saw blade is configured to be fixedly attached to the grip handle 2 due to the handle fitting part 3 being insertably fixed to the grip handle 2 (the guide member 4).

The handle fitting part 3 of the present example, which is joined to the blade plate part 10, is formed into a trapezoidal shape in which the length of the side-edge part on the blade part side is set to be less than the length of the side-edge part of the opposing rear part side. Additionally, the side-edge part of the blade part side is provided at a slight incline (such that the opposing gap decreases progressively toward the distal end side; an angle of approximately 3° inclination in the present example) relative to the side-edge part of the rear part side, and the handle fitting part 3 is formed into a tapering shape that is easily inserted into the guide member 4.

Furthermore, in the handle fitting part 3 of the present example, a cutaway groove part 11, for avoiding interference with the restraining mechanism 5 provided to the grip handle 2 when the handle fitting part 3 is inserted into the grip handle 2 (the guide member 4), is formed by inwardly (toward the proximal end part of the handle fitting part 3) cutting away the distal end part of the handle fitting part 3 in the center vicinity up to the center vicinity of the plate surface of the handle fitting part 3, and a handle-fitting-part-side insertion hole 12, through which the restraining mechanism 5 is inserted, is formed in the vicinity of the center part of the handle fitting part 3, which is the inner part of the cutaway groove part 11.

Furthermore, the handle fitting part 3 of the present example, as previously described, is configured such that the slit part 8 for imparting a spring effect to the handle fitting part 3 is formed; specifically, the slit part 8 is formed only in the blade part side of the handle fitting part 3.

The slit part 8 is composed of a first slit part 6 formed inward from the side edge part of the handle fitting part 3, and a second slit part 7 formed as a continuation of the first slit part 6 as well as being formed toward the distal end side of the handle fitting part 3 from an inner end part 6A of the first slit part 6.

Specifically, the first slit part 6 is formed inward from a position in the vicinity of the proximal end part of the handle fitting part 3, i.e., the vicinity of the border between the handle fitting part 3 and the blade plate part 10 constituting the saw blade 1, and the second slit part 7 is configured from a side-edge-extending slit part 7A formed along the side-edge part of the handle fitting part 3, and a distal-end-edge-extending slit part 7B formed continuously with the side-edge-extending slit part 7A as well as being formed along the distal-end-edge part of the handle fitting part 3. Additionally, the handle fitting part 3 is configured so that due to the formation of the slit part 8, a slit outer-side part 9 positioned on the outer side of the slit part 8 elastically moves (elastically deforms) inward when bearing external force exerted inward from the side-edge part side of the handle fitting part 3.

More specifically, in the present example, the slit part 8, i.e., both the first slit part 6 and the second slit part 7 are formed by laser machining into thin lines measuring 1 mm or less in width and are formed along the outer edge part of the handle fitting part 3 at a gap measuring approximately 5 mm from the outer edge part of the handle fitting part 3, and in the second slit part 7, a terminal end part 7C of the distal-end-edge-extending slit part 7B, which is formed along the distal end-end edge of the handle fitting part 3, is formed by being cut away inward up to a position near the distal end than the outer-side corner of the handle fitting part 3.

That is, the handle fitting part 3 of the present example is configured such that the slit part 8 formed as described above generates an external force (e.g., pressing force) that acts inward on the handle fitting part 3 from the outer-side part, whereby a V-shaped region (the slit outer-side part 9) positioned on the outer side of the slit part 8 of the handle fitting part 3 elastically turns (undergoes contracting elastic deformation) inward starting at the terminal end part of the slit part 8, i.e., the terminal end part 7C of the distal-end-edge-extending slit part 7B of the second slit part 7, and this elastic turning action of the V-shaped slit outer-side part 9 causes the entire outer-side edge part of the blade-part side of the handle fitting part 3 to encroach inward and the width dimension of the handle fitting part 3 to decrease, whereby the handle fitting part 3 can be insertably engaged in the guide member 4 even if the width dimension of the handle fitting part 3 is greater than the width dimension of the guide member 4. The shape of the slit part 8, the width dimension of the slit part 8, and the distance dimension from the outer edge part, which is the position where the slit part 8 is formed, can be changed as appropriate depending on, inter alia, the material, thickness, and shape of the handle fitting part 3, and what is described in the present example is not intended by way of limitation.

The grip handle 2 of the present example, in which the saw blade 1 is attached, is configured with a synthetic-resin-case half body abutting on and linked to the grip handle 2, the guide member 4 and the restraining mechanism 5 being provided therein.

The guide member 4 is formed into a plate shape and is configured such that guide edge parts 4A are provided upright to both the left and right edge parts. Furthermore, the approximate center part of the plate surface of the guide member 4 is provided with a guide-member-side insertion hole 13 that communicates with the handle-fitting-part-side insertion hole 12 provided to the previously-described handle fitting part 3 insertably engaged in the guide member 4.

The restraining mechanism 5 is composed of a push-operated part 14, a locking pin 15, and a spring body 16, and the locking pin 15 is composed of a tapered insertion-locking part 15A that makes it impossible for the aforementioned handle-fitting-part-side insertion hole 12 of the handle fitting part 3 and the guide-member-side insertion hole 13 of the guide member 4 to pass through, and an operated-part-connecting rod 15B of which the diameter is smaller than the width dimension of the cutaway groove part 11 of the handle fitting part 3. When the handle fitting part 3 is to be insertably engaged in the guide member 4, the locking pin 15 descends and retracts against the urging of the spring body due to the push-operated part 14, which is exposed in the surface of the grip handle 2, being pushed, enabling the handle fitting part 3 to be insertably engaged in the guide member 4, and when the pressing of the push-operated part 14 is released after the handle fitting part 3 has been insertably engaged in the guide member 4, the locking pin 15 is returned by the urging of the spring body 16, the tapered insertion-locking part 15A of the locking pin 15 is insertably engaged in the handle-fitting-part-side insertion hole 12 and the guide-member-side insertion hole 13, and the handle fitting part 3 can then be taken out of the guide member 4. When the saw blade 1 is taken out of the grip handle 2, i.e., when the insertion-engaging between the handle fitting part 3 and the guide member 4 is released, as with the action of inserting, the locking pin 15 is retracted by pushing the push-operated part 14, whereby the insertion-locking of the tapered insertion-locking part 15A is released, and the handle fitting part 3 comes free from the guide member 4, enabling the saw blade 1 to be taken out of the grip handle 2.

The present example mainly describes the elimination of adverse events that occur when the width dimension of the handle fitting part 3 is greater than the width dimension of the guide member 4 due to a spring effect being imparted to the handle fitting part 3 by the formation of the slit part 8, but, for example, if the width dimension of the handle fitting part 3 is designed in advance to be greater than the width dimension of the guide member 4 and the handle fitting part 3 is caused to move elastically by the spring effect imparted by the slit part 8 in a normal state in which machining was carried out as designed, thus causing the handle fitting part 3 to be insertably engaged in the guide member 4, then even when the width dimension of the handle fitting part 3 is smaller than designed due to machining error or even when the width dimension of the guide member 4 is greater than designed, either the ratio by which the handle fitting part 3 is larger than the guide member 4 is symptomatically smaller or the width dimensions of the handle fitting part 3 and the guide member are approximately equal; therefore, clearance large enough to allow rattling between the handle fitting part 3 and the guide member 4 can be avoided as much as possible. Consequently, even in a state in which the handle fitting part 3 is larger than the guide member 4 or smaller than the guide member 4 due to machining error, and either the saw blade 1 could not be mounted in the grip handle 2 if the structure were a prior-art structure or rattling occurs when the saw blade 1 is mounted in the grip handle 2, the handle fitting part 3 can be fixedly positioned without rattling in the guide member 4 and the saw blade 1 can be firmly and fixedly mounted in a satisfactory state with no rattling.

The present invention is not limited to the present example, and the specific configurations of the constituent elements can be designed as appropriate.

The invention claimed is:

1. A replaceable-blade-type saw comprising:
    a grip handle including a saw blade guide and a lock pin housed therein; and
    a saw blade including a handle fitting portion provided in a base end thereof, the handle fitting portion being configured to be guided within and engagably inserted into the saw blade guide of the grip handle, the handle fitting portion including an insertion hole, wherein
    the saw blade is releasably restrained within the grip handle by engagement between the lock pin and the insertion hole, such that when the lock pin is engaged, the saw blade does not withdraw from the grip handle, and when the lock pin is disengaged, the saw blade can be withdrawn from the grip handle to allow replacement thereof,
    the handle fitting portion of the saw blade includes a first slit formed inward from a side edge of the handle fitting portion, and a second slit, formed as a continuation of the first slit, and extending toward a distal end of the handle fitting portion from an inner end part of the first slit, the first slit and the second slit being formed on at least one of a blade side portion and a rear side portion of the handle fitting portion, and the second slit extending more rearward toward the distal end of the handle fitting portion than the insertion hole,
    the handle fitting portion also including a slit outer-side portion positioned on an outer side of the first and second slits, the slit outer-side portion being elastically deformable in an inward direction by application of an external force exerted inward with respect to the slit outer-side portion, wherein
    the second slit includes a side-edge-extending slit portion formed along the side-edge of the handle fitting portion, and a distal-end-edge-extending slit portion formed continuously with the side-edge-extending slit portion and being formed along the distal-end-of the handle fitting portion,
    wherein the first slit has a single width and the second slit has a single width, the single width of the first slit and the single width of the second slit being a same width of 1 mm or less.

2. The replaceable-blade-type saw according to claim 1, wherein the first slit is formed in a proximal end portion of a blade plate portion of the saw blade, inward from a proximal end portion of the handle fitting portion.

3. The replaceable-blade-type saw according to claim 1, wherein the handle fitting portion is formed into a trapezoid shape in which a length of a side-edge portion thereof on the blade side portion of the handle fitting portion is set to be shorter than a length of a side-edge portion thereof on the rear side portion of the handle fitting portion, and the first and second slits are formed on the blade side portion of the handle fitting portion, where the side-edge portion is shorter.

4. The replaceable-blade-type saw according to claim 1, wherein the handle fitting portion is formed into a trapezoid shape in which a length of a side-edge portion thereof on the blade side portion of the handle fitting portion is set to be shorter than a length of a side-edge portion thereof on the rear side portion of the handle fitting portion, and the first and second slits are formed on the blade side portion of the handle fitting portion where the side-edge portion is shorter.

5. The replaceable-blade-type saw according to claim 2, wherein the second slit includes a side-edge-extending slit portion formed along the side-edge of the handle fitting portion, and a distal-end-edge-extending slit portion formed continuously with the side-edge-extending slit portion and being formed along the distal-end-of the handle fitting portion.

6. The replaceable-blade-type saw according to claim 2, wherein the handle fitting portion is formed into a trapezoid shape in which a length of a side-edge portion thereof on the blade side portion of the handle fitting portion is set to be shorter than a length of a side-edge portion thereof on the rear side portion of the handle fitting portion, and the first and second slits are formed on the blade side portion of the handle fitting portion, where the side-edge portion is shorter.

7. The replaceable-blade-type saw according to claim 5, wherein the handle fitting portion is formed into a trapezoid shape in which a length of a side-edge portion thereof on the blade side portion of the handle fitting portion is set to be shorter than a length of a side-edge portion thereof on the rear side portion of the handle fitting portion, and the first and second slits are formed on the blade side portion of the handle fitting portion where the side-edge portion is shorter.

* * * * *